United States Patent [19]

Jardine

[11] Patent Number: 5,121,946
[45] Date of Patent: Jun. 16, 1992

[54] PIPE REPAIR OR JOINING COLLAR

[75] Inventor: Robert W. Jardine, Cheshire, England

[73] Assignee: E. Peart & Company Limited, Cheshire, England

[21] Appl. No.: 575,861

[22] Filed: Aug. 31, 1990

[30] Foreign Application Priority Data

Feb. 2, 1990 [GB] United Kingdom ............... 9002312

[51] Int. Cl.⁵ .......................................... F16L 55/172
[52] U.S. Cl. ...................................... 285/15; 285/177; 285/373; 285/379
[58] Field of Search ................. 285/15, 373, 419, 406, 285/177, 112, 379

[56] References Cited

U.S. PATENT DOCUMENTS

| 2,690,193 | 9/1954 | Smith | 285/373 X |
| 3,467,141 | 9/1969 | Smith | 285/373 X |
| 3,790,194 | 2/1974 | Kimberley | 285/373 |
| 4,652,023 | 3/1987 | Timmons | 285/373 X |
| 4,768,813 | 9/1988 | Timmons | 285/373 |
| 4,896,902 | 1/1990 | Weston | 285/373 X |

Primary Examiner—Dave W. Arola
Attorney, Agent, or Firm—Nies, Kurz, Bergert & Tamburro

[57] ABSTRACT

A pipe repair or joining collar comprising a pair of rigid arcuate casing members (10) which may be drawn together around a damaged pipe or a pair of pipe ends with the interposition of one or more elastomeric arcuate seals (13) and wedges (17) located between the casing members and the seals and adapted to slide inwardly and generally tangentially to force the seals radially inwards to ensure sealing engagement with the pipe or pipe ends, mutually abutting longitudinal resilient sealing strips (16) projecting, at least in part, from opposed faces of the wedges (17) in a manner such that in at least one region of each pair one of the sealing strips is substantially flush with its associated face whilst the other projects from it so that during assembly the projecting strip may ride laterally onto the flush strip to ensure lateral alignment of the casing members.

4 Claims, 2 Drawing Sheets

PIPE REPAIR OR JOINING COLLAR

THIS INVENTION relates to split collars for repairing or joining pipes such as gas pipes and water pipes, and is a development of the collar described and claimed in our British Patent No. 2189000.

Collars for repairing or joining pipes take many different forms. Usually they must be designed to correspond very closely with the outer diameter of the pipes to be joined thus to ensure a watertight or gas tight seal. Since the collars are designed to be fitted to existing underground mains some of which can be 100 years old or more, it is very difficult to ensure that they will always provide an adequate seal. Owing to changing standards, materials, manufacturing techniques and corrosion, pipes of the same nominal diameter can vary widely in actual diameter. Therefore, it is desired that the repair collar should be able to accommodate wide variations in pipe diameter.

British Patent no. 2189000 describes a pipe repair or joining collar comprising a plurality of arcuate segments with clamping means for drawing the segments together around a damaged pipe or a pair of pipe ends, with interposition of one or more corresponding elastomeric arcuate sealing means, characterized by wedge-like members located between the segments and at least a part of the sealing means in the regions of the clamping means and adapted to slide inwardly and generally tangentially with respect to the segments as the latter are drawn together, thus to force the sealing means radially inwards in said regions.

An object of the present invention is to provide a further improved pipe repair or joining collar which is easily installed, includes the minimum of different parts and may accommodate two pipes of different diameters.

According to the present invention there is provided a pipe repair or joining collar comprising a pair of rigid arcuate casing members with clamping means for drawing the members together around a damaged pipe or a pair of pipe ends, with interposition of one or more corresponding elastomeric arcuate sealing means, and wedges located between the casing members and at least a part of the sealing means in the regions of the clamping means and adapted to slide inwardly and generally tangentially with respect to the casing members as the latter are drawn together thus to force the sealing means radially inwards in said regions, characterized by pairs of mutually abutting resilient sealing strips extending parallel to the axis of the collar and projecting from opposed faces of the wedges and located in channels therein to form a longitudinal seal between the wedges; and in that in at least one longitudinal region of each pair of abutting sealing strips, one of the pair is substantially flush with the rim of its associated channel whilst the other projects above its channel such that, during assembly, if the wedges and thus the sealing strips, are radially displaced, the projecting strip may ride laterally onto the flush strip to restore alignment.

Preferably, said opposed faces of the wedges are parallel and inclined with respect to the axis of the collar whilst the bases of said channels therein are parallel with each other and with the axis of the collar.

An embodiment of the invention will now be described, by way of example only, with reference to the accompanying drawings in which.

Figure 4:
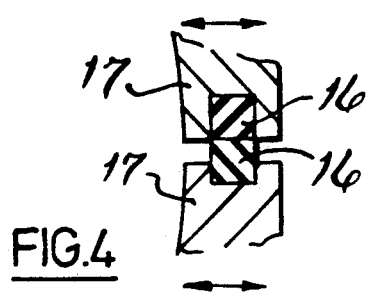
FIG. 4 is a sectional view taken on lines IV—IV of FIG. 3.
Figure 5:
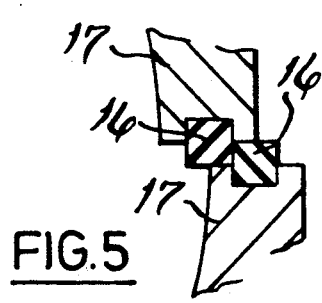

and FIG. 5 is a view similar to FIG. 4 illustrating a problem which could exist but for the features to be described.

A pipe repair or joining collar in accordance with the invention includes a pair of semi-cylindrical segments of cast iron or a similar material having a life expectancy of 50 years when placed underground. Each segment 10 has at each end thereof a pair of radially directed bolt-receiving lugs 11 for drawing the segments together by means of bolts 12.

Each segment 10 receives an elastomeric sealing member generally indicated at 13 and consisting of circumferential sealing strips 14 and longitudinal sealing strips 15 and 16. Strips 16 serve to join adjacent ends of the circumferential strips 14, whilst strips 15 also extend between the latter but at circumferential positions spaced from their ends.

Adjacent each pair of radial lugs 11 and disposed between the body of the segment in this region and the adjacent part of the sealing member 13 is a sliding wedge-like member 17. As can be seen from the lower part of FIG. 1, each wedge 17 is retained in position on its associated segment 10 by means of the arcuate sealing strips 14 and the longitudinal sealing strips 15 and 16 with the strips located in respective channels in the wedge.

Internally protruding ribs 18 integral with segments 10, serve to prevent the longitudinal movement of the sealing members 13 and wedges 17.

Figure 2:
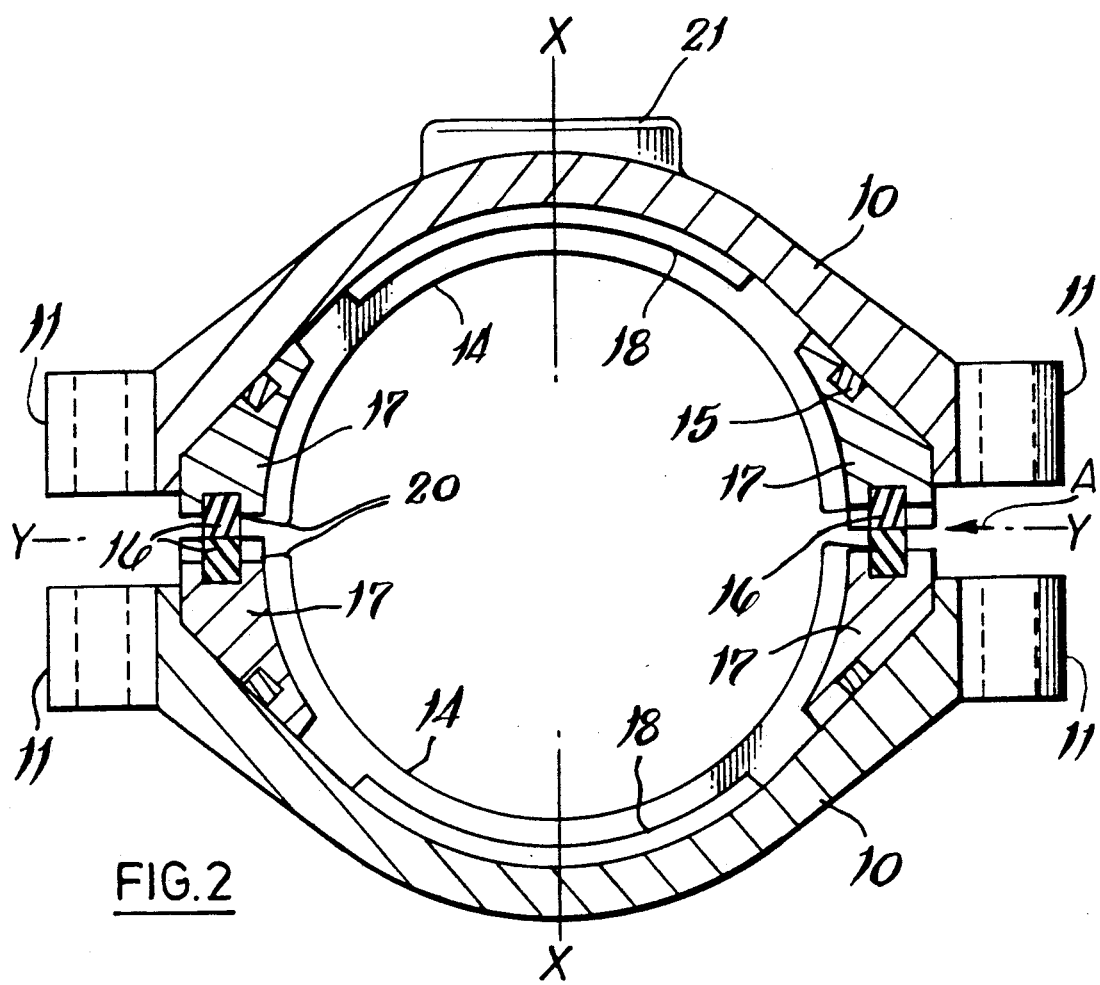
FIG. 2 is a sectional view taken along line II—II of FIG. 1.

As can be seen from FIG. 2, each wedge 17 slidingly abuts a generally tangential inner face of the segment 10. By this means, as the segments are drawn together by bolts 12, after initial contact of raised abutting surfaces 20 of arcuate sealing strips 14, and after initial contact of corresponding longitudinal strips 16, further closure of the segments 10 will cause the wedges 17 to slide generally tangentially with respect to the segments thus to force the sealing members radially inwards in the regions of the radial lugs 11. Thus, as depicted in FIG. 2 as the collar closes onto the pipe (not shown) along the X—X axis, the wedges 17 force the sealing members 13 inwards at right angles along the Y—Y axis. Thus there is a substantially uniform reduction in diameter around the pipe to ensure a good seal thereon substantially without deformation of the segments themselves.

For example, on a nominal 150 mm diameter pipe, the range of actual diameters which may be accommodated whilst providing an effective seal is at least 20 mm.

For ease of assembly the sealing members 13 and wedges 17 may be loosely retained relative to the segments 10 by rubber retaining straps 24 integral with members 13 and located on pegs 23 projecting from the sides of segments 10. Movement of the wedges during closure, is accommodated by the resilient nature of straps 24 which serve no other purpose after installation.

To ensure uniform tangential and radial movement of all wedges during closure, the wedges have opposed faces which are parallel but inclined with respect to the axis of the collar whilst the channels in which strips 16 are located are parallel to the said axis. This is illustrated in FIG. 3.

Figure 3:
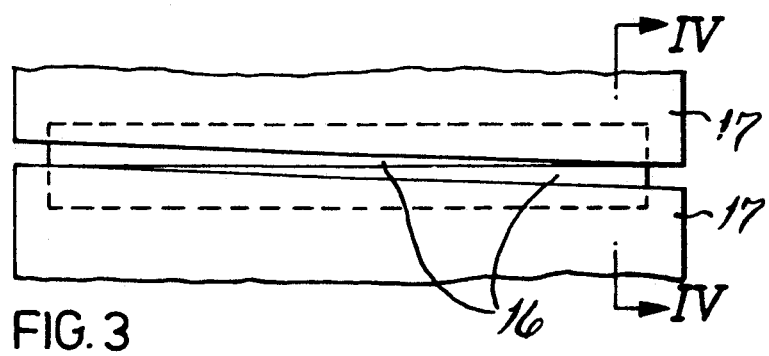
FIG. 3 is a side view showing part of the collar, and taken in the direction of arrow A in FIG. 2.

Close to the right hand end of FIG. 3 the parts are as shown in the cross-section of FIG. 4, i.e. the whole of the depth of upper strip 16 is contained within the upper wedge channel whilst the lower strip 16 protrudes from its channel. Conversely, at the left hand end of FIG. 3 the lower strip 16 is wholly contained in the lower wedge channel whilst the upper strip protrudes. Therefore, during assembly, if the parts should assume the misaligned condition illustrated in FIG. 5, alignment would be restored by the upper strip at the left hand end, and the lower strip at the right hand end, readily sliding onto their respective opposed strips which are flush with their respective wedge surfaces.

Alignment will always be ensured provided, in the design of opposed wedge faces, there is always at least one region of the opposed faces where such a relationship exists.

In an alternative arrangement, the wedge channels themselves may be of varying depth longitudinally, whilst the opposed wedge faces are parallel to the axis of the collar. However in this case the strips 16 would become twisted during closure of the collar, relative to the remainder of members 13, which could lead to failure.

In a further alternative, one strip 16 could be wholly contained in its respective channel, whilst the opposed strip protrudes, but in this case either the strips or the channels must be "handed" so that there would be a risk of improper assembly. Therefore, the arrangement illustrated in FIG. 3 is preferred.

As can be seen from FIG. 2, one or both segments of the collar can be bored as at 21 to provide a T-connection.

The collar may be of any required length with any number of fastening bolts, and it may serve as a clamp with physical properties to anchor the pipes against longitudinal movement, in addition to its role as a sealing device.

Figure 1:
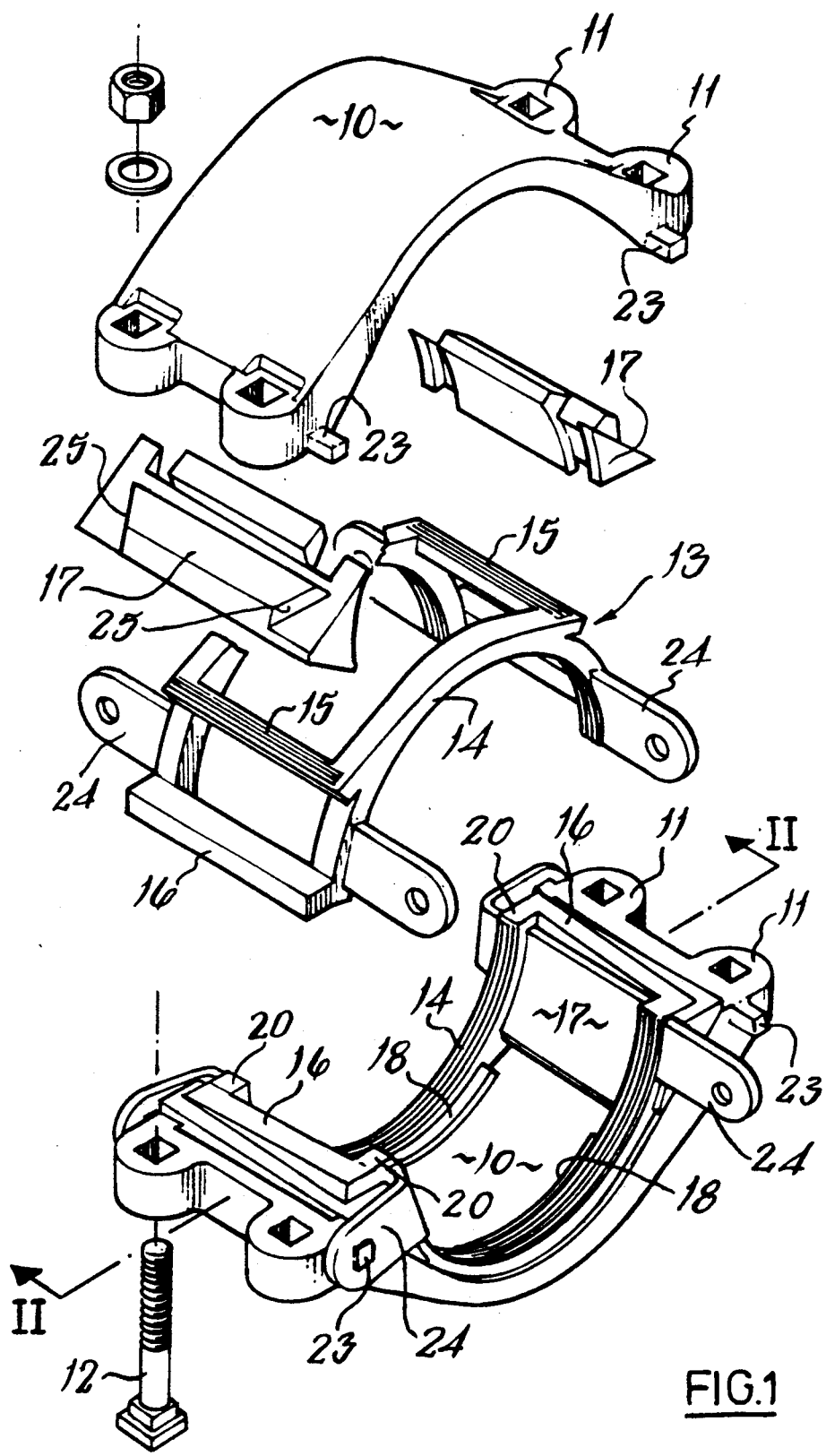
FIG. 1 is an exploded view of the essential parts of a pipe repair or joining collar.

As can be seen in FIG. 1 in each wedge 17, there is at each end on its outer surface a recessed portion whose inner extremity forms a step 25 which towards its outer edge is angled away from the adjacent end face of the wedge. Thus the wedges may have some rotational movement about their radial axes between the flanged end faces of the segments as the collar is assembled. This feature is to accommodate two pipe ends of slightly different diameters whilst ensuring that both arcuate parts 14 of the sealing members 13 will be sealingly clamped onto the outer surfaces of the pipes, with the entire collar assuming a slightly conical formation accordingly.

The wedges can be made from cast iron or solid rubber, or any other material which will slide with respect to the inner surfaces of the segments. In addition, whilst a straight sliding path has been depicted, this may be slightly curved about the collar axis.

One of the principal advantages of a collar produced in accordance with the invention when compared with one whose segmental walls are intended to deform is that in the present case the segments can be made of a very rigid and durable material, since substantially no deformation of the segments is required.

The invention may be applied also to so-called "full seal clamps" where a resilient sealing gasket in one or more pieces, is wrapped around a damaged pipe to form a sleeve retained in two or more arcuate clamping segments similar to segments 10 drawn together to force the sleeve into sealing contact with the outer surface of the pipe.

In this case, as in the previous embodiment, wedge-like members are provided between the sealing sleeve and the clamping segments, and slide tangentially as the segments are tightened thus to force the sleeve radially inwards in that region.

In some cases, with this embodiment the wedges may be of hollow section and the segments may be afforded a degree of flexibility to enable them to conform to the actual size of the pipe and its shape in cases where the pipe has become deformed from a circular cross-section.

I claim:

1. A pipe repair collar having a longitudinal axis and comprising a pair of rigid arcuate casing members with clamping means for drawing the members together around a damaged pipe or a pair of pipe ends, with interposition of at least one corresponding elastomeric arcuate sealing means, and wedges located between the casing members and at least a part of the sealing means in the regions of the clamping means and engaging the casing members so as to slide inwardly and generally tangentially with respect to the casing members away from the clamping means as the latter are drawn together thus to force the sealing means radially inwards in said regions, characterized by pairs of mutually abutting resilient sealing strips extending parallel to the axis of the collar and projecting from opposed faces of the wedges and located in channels therein to form a longitudinal seal between the wedges; each of said channels having a base therein; and in that in at least one longitudinal region of each pair of abutting sealing strips, one of the pair is substantially flush with the rim of its associated channel while the other of the pair projects above its channel such that, during assembly, if the wedges and thus the sealing strips, are radially displaced, the projecting strip may ride laterally onto the flush strip to restore alignment of the sealing strips.

2. A pipe repair collar according to claim 1, wherein said opposed faces of the wedges are parallel with each other but inclined with respect to the longitudinal axis of the collar while the bases of said channels therein are parallel with each other and with the longitudinal axis of the collar.

3. A pipe repair collar according to claim 1, wherein said wedges have a radial axis normal to the longitudinal axis of the collar and wherein said wedges have tapered abutments which permit angular rotation of the wedges about their radial axes and wherein said wedges are formed, and disposed within the collar, such that upon closing of the casing members together the wedges are permitted some rotational movement relative to the longitudinal axis of the collar such that two pipe ends of slightly different diameters may be accommodated while ensuring sealing contact of said elastomeric arcuate sealing means with said pipe ends.

4. A pipe repair collar according to claim 1, wherein said elastomeric arcuate sealing means includes a plurality of resilient retaining straps attachable to said rigid arcuate casing members thus to retain the sealing means relative to the casing members during assembly.

* * * * *